United States Patent
Asayama et al.

(10) Patent No.: US 9,028,630 B2
(45) Date of Patent: May 12, 2015

(54) PNEUMATIC TIRE AND MANUFACTURING METHOD OF PNEUMATIC TIRE

(75) Inventors: Yoshinori Asayama, Osaka (JP); Eiji Azuma, Osaka (JP)

(73) Assignee: Toyo Tire & Rubber Co., Ltd., Osaka-Shi (JP)

( * ) Notice: Subject to any disclaimer, the term of this patent is extended or adjusted under 35 U.S.C. 154(b) by 527 days.

(21) Appl. No.: 11/815,141

(22) PCT Filed: Dec. 20, 2006

(86) PCT No.: PCT/JP2006/325323
§ 371 (c)(1),
(2), (4) Date: Jul. 31, 2007

(87) PCT Pub. No.: WO2007/097104
PCT Pub. Date: Aug. 30, 2007

(65) Prior Publication Data
US 2010/0006194 A1    Jan. 14, 2010

(30) Foreign Application Priority Data

Feb. 20, 2006 (JP) .................................. 2006-042259
Mar. 13, 2006 (JP) .................................. 2006-067131

(51) Int. Cl.
*B29D 30/60* (2006.01)
*B60C 11/00* (2006.01)
(Continued)

(52) U.S. Cl.
CPC ................ *B60C 19/08* (2013.01); *B29D 30/60* (2013.01); *B29D 2030/526* (2013.01); *Y10S 152/02* (2013.01)

(58) Field of Classification Search
USPC ....... 152/152.1, 209.5, DIG. 2; 156/117, 123, 156/128.1, 130
See application file for complete search history.

(56) References Cited

U.S. PATENT DOCUMENTS 3,177,918 A * 4/1965 Holman .......................... 156/130
6,834,693 B1 * 12/2004 Calvar et al. .............. 152/DIG. 2
(Continued)

FOREIGN PATENT DOCUMENTS

DE      19718699        5/1998
EP      0 681 931 A1    11/1995
(Continued)

OTHER PUBLICATIONS

Machine translation for Japan 11-227415 (no date).*
(Continued)

*Primary Examiner* — Steven D Maki
(74) *Attorney, Agent, or Firm* — Knobbe Martens Olson & Bear LLP

(57) ABSTRACT

In the invention, at least a tire outer circumferential side portion of a tread portion is formed of a non-conductive rubber layer. The non-conductive rubber layer is formed by winding and laminating a non-conductive rubber ribbon along a tire circumferential direction. A conductive layer is provided on an outer circumference of the non-conductive rubber ribbon, and the conductive layer continuously and spirally extends along the tire circumferential direction, and is exposed on a tread surface from a bottom surface of the non-conductive rubber layer toward a tire outer circumferential side. Accordingly, an electricity generated in a vehicle body is discharged to a road through the conductive layer. Since the conductive layer is scattered within the non-conductive rubber layer and exposure on the tread surface is preferably secured, it is possible to achieve an excellent conductivity.

7 Claims, 7 Drawing Sheets

(51) Int. Cl.
  *B60C 19/08* (2006.01)
  *B29D 30/52* (2006.01)

(56) References Cited

U.S. PATENT DOCUMENTS

| | | | |
|---|---|---|---|
| 2002/0007893 A1* | 1/2002 | Koyama et al. | 156/123 |
| 2004/0224152 A1* | 11/2004 | Lamoine et al. | 428/364 |
| 2006/0042733 A1* | 3/2006 | Matsui | 156/130 |
| 2006/0042737 A1* | 3/2006 | Hayashi et al. | 156/130 |
| 2007/0017615 A1* | 1/2007 | Nobuchika et al. | 152/152.1 |

FOREIGN PATENT DOCUMENTS

| | | | |
|---|---|---|---|
| EP | 931678 A2 | * | 7/1999 |
| EP | 1 632 367 A1 | | 3/2006 |
| JP | 10-323917 A | * | 12/1998 |
| JP | 2944908 | | 6/1999 |
| JP | 631678 | * | 7/1999 |
| JP | 11-227415 | * | 8/1999 |
| JP | 2004-136808 | | 5/2004 |
| JP | 2005-41055 | | 2/2005 |
| JP | 2006-69341 | | 3/2006 |

OTHER PUBLICATIONS

Machine translation for Europe 931678 (no date).*
Machine translation for Japan 10-323917 (no date).*
Chinese Office Action dated Jul. 24, 2009 for counterpart Chinese Patent Application No. 200680053013.9.
Office Action dated Nov. 17, 2010; Application No. 11 2006 003 758.7-16.
Mar. 15, 2011 Japanese Office Action for Japanese Counterpart Application No. 2008-501625.
Office Action dated Jul. 2, 2013 in corresponding German Patent Application No. 112006003758.7.
Office Action dated Jul. 2, 2013 in corresponding German Patent Application No. 112006004257.2.

* cited by examiner

PNEUMATIC TIRE AND MANUFACTURING METHOD OF PNEUMATIC TIRE

This application is the U.S. National Phase under 35 U.S.C. §371 of International Application PCT/JP2006/325323, filed Dec. 20, 2006, which claims priority to Japanese Patent Application No. 2006-042259, filed Feb. 20, 2006 and Japanese Patent Application No. 2006-067131, filed Mar. 13, 2006. The International Application was published under PCT Article 21(2) in a language other than English.

TECHNICAL FIELD

The present invention relates to a pneumatic tire in which a tire outer circumferential side portion of a tread portion is constructed by a non-conductive rubber layer, and a manufacturing method of the pneumatic tire.

BACKGROUND ART

Conventionally, for the purpose of reducing a rolling resistance of a tire which has a strong connection to a good mileage of a vehicle, there has been known a pneumatic tire in which a tread rubber is highly compounded with a silica. This is structured by reducing a compounding amount of a carbon black causing a hysteresis loss and compounding the silica alternatively. Accordingly, it is possible to reduce the rolling resistance and achieve the good mileage, and it is possible to increase a braking force on a wet road so as to improve a wet performance.

However, the tread rubber mentioned above has a higher electric resistance in comparison with the tread rubber in which only the carbon black is compounded, and has a problem that if a static electricity and an electricity generated by an internal friction at a time when a rubber is deformed or the like are accumulated in a vehicle body, there is generated a problem such as an earth to the human body, a radio noise or the like. Accordingly, there has been developed a pneumatic tire structured such that a conductive layer in which the carbon black or the like is compounded is provided in a non-conductive tread rubber in which the silica or the like is compounded, thereby discharging the electricity generated in the vehicle body to the road.

For example, the following Patent Document 1 describes a pneumatic tire in which a non-conductive tread rubber is provided with a conductive layer extending to an outer side in a tire diametrical direction from a bottom surface thereof so as to reach a tread surface. However, in the tire mentioned above, there is a problem that a forming position of the conductive layer is affected by a pattern design, and there is a case where a conductivity is insufficient in the other pattern designs than the rib pattern continuously extending in the tire circumferential direction. Further, in the case where the conductive layers mentioned above are formed at plural numbers, there is a problem that a manufacturing step becomes complicated.

On the other hand, there can be considered to apply a liquid material such as a rubber paste or the like having a conductive rubber compounded to a region reaching a bottom surface from both sides in a width direction of a tread surface via a side surface, thereby forming a conductive layer and applying a conductive performance. However, in the tire mentioned above, there is a case where the conductive performance cannot be sufficiently achieved in some wear state of the tread rubber such as a case where only a shoulder is worn in an early stage.

The following Patent Document 2 describes a pneumatic tire in which a conductive layer extends in a lottery shape or a net shape from a tread surface to a bottom surface. The tread rubber is formed by partly or wholly covering a surface of a non-conductive rubber ribbon with a conductive layer, and winding and laminating it along a tire circumferential direction. However, in the tire mentioned above, since the conductive rubber layer is continuously exposed onto the tread surface in correspondence to the wear state as well as a rate of the conductive rubber is increased more than necessary, there is a case where the good mileage and the wet performance corresponding to an original purpose cannot be achieved.

The following Patent Document 3 describes a pneumatic tire in which a non-conductive tread rubber is provided with a conductive layer which continuously and spirally extends along a tire circumferential direction, and in which one end is exposed on a tread surface and the other end comes into contact with a sidewall rubber. The tread rubber is formed by winding a non-conductive rubber ribbon along a tire circumferential direction, forming a rubber layer of a predetermined cross sectional shape having a step portion, thereafter winding the conductive rubber ribbon on the rubber layer, and further winding the non-conductive rubber ribbon thereon. However, in the tire mentioned above, there is a case where the conductive rubber exposed on the tread surface is extremely reduced in some wear state of the tread rubber, and there is a risk that the conductive performance cannot be sufficiently secured. Further, there is a tendency that a manufacturing step is complicated and a productivity is lowered.

Patent Document 1: DESCRIPTION of Japanese Patent No. 2944908

Patent Document 2: Japanese Unexamined Patent Publication No. H11-227415

Patent Document 3: Japanese Unexamined Patent Publication No. 2004-136808

DISCLOSURE OF THE INVENTION

Problem to be Solved by the Invention

The present invention is made by taking the circumstance mentioned above into consideration, and an object of the present invention is to provide a pneumatic tire which can achieve an excellent conductive performance without deteriorating an improving effect caused by structuring an outer circumferential side portion of a tread portion by a non-conductive rubber layer, and a manufacturing method of the pneumatic tire.

Means for Solving the Problems

The object can be achieved by the present invention having the following structure. That is, the pneumatic tire in accordance with the present invention is a pneumatic tire comprising: a non-conductive rubber layer constructing at least a tire outer circumferential side portion of a tread portion and formed by winding and laminating a non-conductive rubber ribbon along a tire circumferential direction; and a conductive layer provided in a part of the non-conductive rubber ribbon and continuously and spirally extending along the tire circumferential direction, wherein the conductive layer is exposed on a tread surface from a bottom surface of the non-conductive rubber layer toward a tire outer circumferential side.

In the pneumatic tire in accordance with the present invention, the tire outer circumferential side portion of the tread portion is structured by the non-conductive rubber layer, and the non-conductive rubber layer is structured by winding and laminating the non-conductive rubber ribbon. The conductive layer is embedded in the non-conductive rubber layer, and the conductive layer continuously and spirally extends along the tire circumferential direction. Further, since the conductive layer is exposed on the tread surface from the bottom surface of the non-conductive rubber layer toward the tire outer circumferential direction side, the electricity generated in the vehicle body is discharged to the road through the conductive layer.

The conductive layer is provided in a part of the non-conductive rubber ribbon, and continuously and spirally extends along the tire circumferential direction in correspondence to the wound non-conductive rubber ribbon. The non-conductive rubber ribbon is laminated while appropriately changing a winding mode such as an overlapping width of an end portion and the like, in such a manner that a cross sectional shape of the non-conductive rubber layer can be obtained. Further, since the non-conductive rubber layer is arranged in a tire outer circumferential side of the cylindrical carcass ply, a tire meridian cross section is deformed so as to form a gentle arch shape at a time of forming the tire.

Accordingly, the non-conductive rubber ribbon is formed in various cross sectional shapes per a winding position, and the conductive layer provided in a part thereof is scattered at various positions in the tire width direction and various heights of the tire cross section in an inner portion of the non-conductive rubber layer. As a result, even if the conductive layer exposed on the tread surface is worn, the other portions tend to be exposed next to the layer. Accordingly, even in the case where an irregular wear is generated, an exposure of the conductive layer on the tread surface can be preferably secure, so that it is possible to achieve an excellent conductive performance.

In the present invention, since the conductive layer is scattered to the inner portion of the non-conductive rubber layer, it is possible to achieve the excellent conductive performance without being affected by the pattern design. Further, since it is sufficient that the conductive layer is provided in such a degree as to suitably achieve the conductive performance, and it is easy to regulate the volume, the rate of the conductive portion does not become higher than necessary as is different from the tire described in the patent documents mentioned above. Accordingly, it is possible to achieve the excellent mileage performance and wet performance in the case where the non-conductive rubber layer is structured by highly compounding the silica, without deteriorating the improving effect caused by structuring the tire outer circumferential side portion of the tread portion by the non-conductive rubber layer.

The non-conductive rubber layer may structure the tread rubber singly, however, may structure a cap rubber of a so-called cap and base structure in which a base rubber indicating a conductivity is arranged in a tire inner circumferential side. As the non-conductive rubber, there can be exemplified a rubber composition in which the silica is compounded as a reinforcing agent at a high rate. Further, it is preferable that the conductive layer indicates a conductivity in which a specific volume resistance is equal to or less than $10^8$ $\Omega \cdot cm$, whereby it is possible to sufficiently discharge the electricity generated in the vehicle body to the road.

In the pneumatic tire in accordance with the present invention, the conductive layer can be formed of the conductive liquid material applied to the outer peripheral surface of the non-conductive rubber ribbon, or can be formed of the conductive rubber arranged in a part of the non-conductive rubber ribbon.

As the conductive liquid material, it is possible to use any material which is not particularly limited as far as the material is excellent in an adhesive property with the rubber and the conductivity is not deteriorated after passing through a vulcanizing step, and there can be exemplified a rubber paste, a rubber cement and the like in which the carbon black is compounded at a high rate. Further, as the conductive rubber, there can be exemplified a rubber composition in which the carbon black is compounded as the reinforcing agent at a high rate. The conductivity necessary for the conductive layer can be obtained by compounding a predetermined amount of known conductivity applying material such as carbons including a carbon fiber, a graphite and the like in addition to the carbon black, or metals including a metal powder, a metal oxide, a metal flake, a metal fiber and the like.

In the above structure, it is preferable that a plurality of the conductive layers are formed so as to be differentiated in height of a tire cross section, and at least one of the conductive layers is exposed on the tread surface.

In the structure mentioned above, since in a plurality of formed conductive layers, at least one conductive layer extends to the tire outer circumferential side from the bottom surface of the non-conductive rubber layer so as to be exposed on the tread surface, it is possible to discharge the electricity in the vehicle body to the road through the conductive layer. Further, since a plurality of conductive layers are formed while differentiating the height of the tire cross section, it is possible to effectively increase a degree of the scattering of the conductive layers mentioned above, and it is possible to arrange the conductive layer in various positions in the tire width direction and various heights of the tire cross section. As a result, an exposure frequency of the conductive layer in the tread surface is secured, and it is possible to achieve an excellent conductivity.

As a preferable mode for carrying out the present invention, there can be listed up a structure in which the non-conductive rubber layer is formed by continuously and spirally winding and laminating a first rubber ribbon provided with the conductive layer in a part of the tire outer circumferential side portion of the non-conductive rubber, and a second rubber ribbon provided with the conductive layer in a part of the non-conductive rubber ribbon at a different position from the first rubber ribbon, respectively along the tire circumferential direction. Accordingly, it is possible to efficiently form the non-conductive rubber layer and it is possible to increase a productivity.

In the above structure, it is preferable that the conductive layer continuously and spirally extends along the tire circumferential direction while changing a position in a width direction with respect to the non-conductive rubber ribbon.

Since the conductive layer extends while changing the position in the width direction with respect to the non-conductive rubber ribbon, it is possible to more effectively increase the degree of the scattering of the conductive layers mentioned above, and it is possible to arrange the conductive layer in the inner portion of the non-conductive rubber layer at various positions in the tire width direction and various heights of the tire cross section. As a result, the exposure frequency of the conductive layer in the tread surface is secured. Even if the conductive layer is worn, the other portion tends to be newly exposed next to the worn conductive layer. Further, even in the case where the irregular wear is generated, the exposure of the conductive layer on the tread surface can be preferably secured. Accordingly, it is possible to achieve an excellent conductivity.

The manufacturing method of the pneumatic tire in accordance with the present invention is a manufacturing method of a pneumatic tire comprising: a step of setting a conductive layer in a part of a non-conductive rubber ribbon; and a step of forming a non-conductive rubber layer constructing at least a tire outer circumferential side portion of a tread portion by continuously and spirally winding and laminating the non-conductive rubber ribbon along a tire circumferential direction, continuously and spirally extending the conductive layer along the tire circumferential direction, and exposing on a tread surface from a bottom surface of the non-conductive rubber layer toward the tire outer circumferential side.

In accordance with the manufacturing method of the pneumatic tire in accordance with the present invention, the non-conductive rubber layer constructing the tire outer circumferential side portion of the tread portion is formed by winding and laminating the non-conductive rubber ribbon along the tire circumferential direction. The conductive layer is provided in a part of the non-conductive rubber ribbon, and it is possible to extend the conductive layer continuously and spirally along the tire circumferential direction in the inner portion of the non-conductive rubber layer, in correspondence to the wound non-conductive rubber ribbon. Further, a conductive path for discharging the electricity generated in the vehicle body to the road is formed by exposing the conductive layer on the tread surface toward the tire outer circumferential side from the bottom surface of the non-conductive rubber layer.

The non-conductive rubber ribbon is laminated while appropriately changing a winding mode such as an overlapping width of an end portion and the like, in such a manner that a cross sectional shape of the non-conductive rubber layer can be obtained. Further, since the non-conductive rubber layer is arranged in a tire outer circumferential side of the cylindrical carcass ply, a tire meridian cross section is deformed so as to form a gentle arch shape at a time of forming the tire.

Accordingly, the non-conductive rubber ribbon is formed in various cross sectional shapes per a winding position, and the conductive layer provided on an outer circumference thereof is scattered at various positions in the tire width direction and various heights of the tire cross section in an inner portion of the non-conductive rubber layer. As a result, even if the conductive layer exposed on the tread surface is worn, the other portions tend to be exposed next to the layer. Accordingly, even in the case where an irregular wear is generated, an exposure of the conductive layer on the tread surface can be preferably secure, so that it is possible to manufacture the pneumatic tire achieving an excellent conductive performance.

As mentioned above, in the present invention, since the conductive layer is scattered to the inner portion of the non-conductive rubber layer, it is possible to manufacture the pneumatic tire achieving the excellent conductive performance without being affected by the pattern design. Further, since it is sufficient that the conductive layer is provided in such a degree as to suitably achieve the conductive performance, and it is easy to regulate the volume, the rate of the conductive portion does not become higher than necessary as is different from the tire described in the patent documents mentioned above.

In the manufacturing method of the pneumatic tire in accordance with the present invention, the step of setting the conductive layer in a part of the non-conductive rubber ribbon can be executed by applying the conductive liquid material onto an outer circumferential surface of the non-conductive rubber ribbon, or arranging the conductive rubber in a part of the non-conductive rubber ribbon.

The conductive liquid material and the conductive rubber are as mentioned above. As the method of applying the conductive liquid material, there can be listed up a method of throwing off the conductive liquid material on the outer circumferential surface of the non-conductive rubber ribbon in addition to the method of coating by using a brush, a roller or the like. Further, as the method of arranging the conductive rubber, there can be listed up a method of jointing an independently formed ribbon-shaped conductive rubber to the non-conductive rubber ribbon, and a method of co-extruding the non-conductive rubber ribbon and the conductive rubber by using a dual extruding machine.

It is preferable that the manufacturing method of the pneumatic tire further comprising: a step of continuously and spirally winding and laminating along the tire circumferential direction a first rubber ribbon provided with the conductive layer in the tire outer circumferential side portion of the non-conductive rubber ribbon, and extending the conductive layer from the bottom surface of the non-conductive rubber layer to the tire outer circumferential side so as to be exposed on the tread surface; and a step of continuously and spirally winding and laminating along the tire circumferential direction a second rubber ribbon provided with the conductive layer at a position which is a part of the non-conductive rubber ribbon and is different from a position of the first rubber ribbon, and differentiating a height of a tire cross section from the conductive layer of the first rubber ribbon as well as extending the conductive layer from the bottom surface of the non-conductive rubber layer to the tire outer circumferential side.

The method mentioned above is structured such as to form the non-conductive rubber layer by using a plurality of rubber ribbons including the first rubber ribbon and the second rubber ribbon. Each of the first rubber ribbon and the second rubber ribbon is structured such that the conductive layer is provided in the non-conductive rubber ribbon, the conductive layer is provided in the tire outer circumferential side portion in the first rubber ribbon, and the conductive layer is provided in the different position (for example, the tire inner circumferential side portion) from the first rubber ribbon in the second rubber ribbon.

Each of the first rubber ribbon and the second rubber ribbon is continuously and spirally wound and laminated along the tire circumferential direction, and at least the conductive layer of the first rubber ribbon extends to the tire outer circumferential side from the bottom surface of the non-conductive rubber layer so as to be exposed on the tread surface. Accordingly, there is formed the conductive path discharging the electricity generated in the vehicle body to the road.

Further, since the conductive layer of the second rubber ribbon extends while differentiating the height of the tire cross section from the conductive layer of the first rubber ribbon, it is possible to effectively increase the degree of the scattering of the conductive layer mentioned above, and it is possible to arrange the conductive layer at various positions in the tire width direction and at various heights of the tire cross section. As a result, it is possible to secure the exposure frequency of the conductive layer on the tread surface, and it is possible to manufacture the pneumatic tire achieving the excellent conductivity. In this case, it is available to employ the independent rubber ribbon which are the same as or different from the first and second rubber ribbons, with both of the first rubber ribbon and the second rubber ribbon. And, it is preferable that the number of the used rubber ribbons is between 2 and 4 in the light of the productivity.

In the above method, it is preferable that the first rubber ribbon is formed by arranging the conductive rubber in a part of the tire outer circumferential side portion of the non-conductive rubber ribbon, and the second rubber ribbon is formed by arranging the conductive rubber at a position which is the part of the non-conductive rubber ribbon and is different from the position of the first rubber ribbon. Since the first rubber ribbon and the second rubber ribbon are multilayered rubber ribbons in which apart of the non-conductive rubber ribbon is formed of the conductive rubber, it is possible to efficiently form the non-conductive rubber layer in which the conductive layer is embedded.

In the above method, it is preferable that the step of setting the conductive layer in the part of the non-conductive rubber ribbon is executed by continuously setting the conductive layer on an outer circumference of the non-conductive rubber ribbon along a longitudinal direction while changing a position in a width direction with respect to the non-conductive rubber ribbon.

In accordance with the method mentioned above, it is possible to continuously and spirally extend the conductive layer along the tire circumferential direction in the inner portion of the non-conductive rubber layer by setting the conductive layer along the longitudinal direction while changing the position in the width direction with respect to the non-conductive rubber ribbon, and it is possible to arrange the conductive layer at various positions in the tire width direction and at various heights of the tire cross section while effectively increasing the degree of the scattering of the conductive layer mentioned above. As a result, it is possible to secure the exposure frequency of the conductive layer on the tread surface, and it is possible to manufacture the pneumatic tire achieving the excellent conductivity.

In the above method, it is preferable that the conductive layer is formed of a conductive liquid material applied to an outer circumferential surface of the non-conductive rubber ribbon. Accordingly, it is possible to simply set the conductive layer extending along the longitudinal direction while changing the position in the width direction with respect to the non-conductive rubber ribbon.

Figure 1:
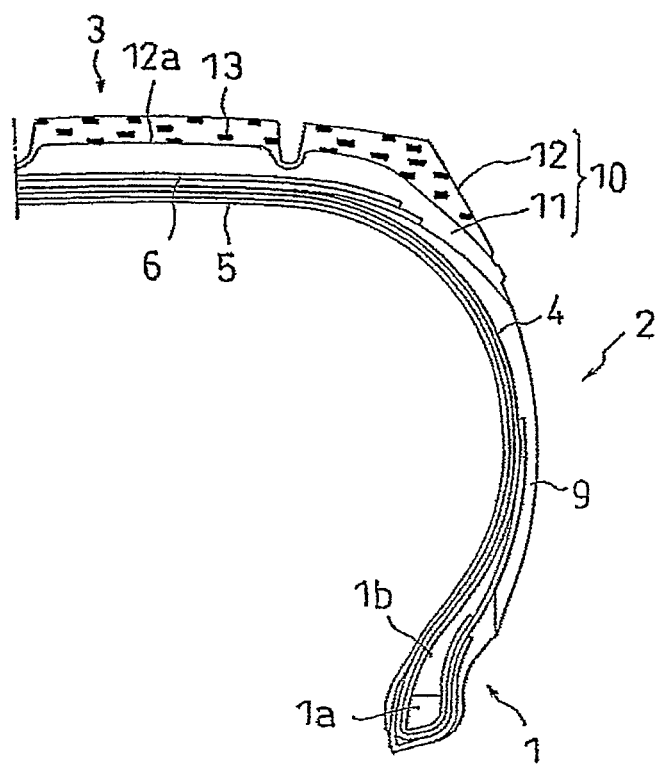
FIG. 1 is a half cross sectional view of a tire meridian showing a pneumatic tire in accordance with a first embodiment of the present invention.

DESCRIPTION OF THE REFERENCE NUMERALS AND SYMBOLS 3 tread portion
10 tread rubber
11 base rubber
12 cap rubber (non-conductive rubber layer)
12a bottom surface of cap rubber
13 conductive layer
14 conductive layer
15 forming drum
17 rubber ribbon feeding apparatus
19 liquid material feeding apparatus
20 conductive liquid material
23 rubber ribbon (first rubber ribbon)
24 rubber ribbon (second rubber ribbon)
EW width of conductive layer

BEST MODE FOR CARRYING OUT THE INVENTION

Description will be given of embodiments in accordance with the present invention with reference to the drawings.
[First Embodiment]

FIG. 1 is a half cross sectional view of a tire meridian showing an example of a pneumatic tire in accordance with the present invention. This pneumatic tire includes a pair of annular bead portions 1, sidewall portions 2 extending from respective bead portions 1 radially outward of the tire, and a tread portion 3 provided between the sidewall portions 2.

In the bead portions 1, an annular bead 1a formed by coating a convergence body of steel wire with rubber, and a bead filler 1b made of hard rubber having substantially triangular cross section. Further, a sidewall rubber 9 is arranged in a side wall portion 2, and a tread rubber 10 is arranged in a tread portion 3. A surface of the tread rubber 10 is provided with a main groove extending along a tire circumferential direction, a horizontal groove extending while intersecting the main groove, and the like, and a predetermined tread pattern is formed.

A portion between the beads 1a is reinforced by a carcass layer 4 constituted by at least one (two in the present embodiment) carcass ply. An inner liner layer 5 for holding an air pressure is arranged in an inner periphery of the carcass layer 4, and a belt layer 6 reinforcing on the basis of a hoop effect is arranged in a tire outer circumference of the tread portion 3 of the carcass layer 4. The belt layer 6 is constituted by two belt plies which are laminated inside and outside.

The tread rubber 10 is formed as a two-layer structure constituted by a base rubber 11 arranged in the tire outer circumference of the belt layer 6, and a cap rubber 12 (corresponding to the non-conductive rubber layer) arranged in the tire outer circumference of the base rubber 11 and constructing a tire outer circumferential side portion of the tread portion 3. The base rubber 11 is compounded with a carbon black as a reinforcing agent at a high rate, and is formed of a conductive rubber indicating a conductivity in which a specific volume resistance is equal to or less than $10^8$ Ω·cm. On the other hand, the cap rubber 12 is formed of a non-conductive rubber in which a silica is compounded as the reinforcing agent at a high rate, and is provided with a conductive layer 13 in an inner portion thereof.

The cap rubber 12 is formed by continuously winding and laminating a non-conductive rubber ribbon along the tire circumferential direction in detail as mentioned below. The conductive layer 13 is provided on an outer peripheral surface of the non-conductive rubber ribbon, and is embedded in the cap rubber 12 in a state of being interposed in a ribbon interface. Further, the conductive layer 13 extends continuously and spirally along the tire circumferential direction, and is exposed on the tread surface from the bottom surface 12a of the cap rubber 12 toward the tire outer circumferential side. Accordingly, an electricity generated in a vehicle body is discharged to a road through the conductive layer 13, and it is possible to prevent various problems such as an earth to a human body, a radio noise and the like.

The conductive layers 13 are scattered to an inner portion of the cap rubber 12 as shown in FIG. 1, in the tire meridian cross section, and are arranged at various positions in the tire width direction and various heights (various positions in a vertical direction in FIG. 1) of the tire cross section. Accordingly, even if the conductive layer 13 exposed on the tread surface is worn, the other portions of the conductive layer 13 tend to be newly exposed next to the worn layer. Since an exposure of the conductive layer 13 on the tread surface is secured even if the irregular wear is generated, it is possible to achieve an excellent conductivity.

Figure 2:
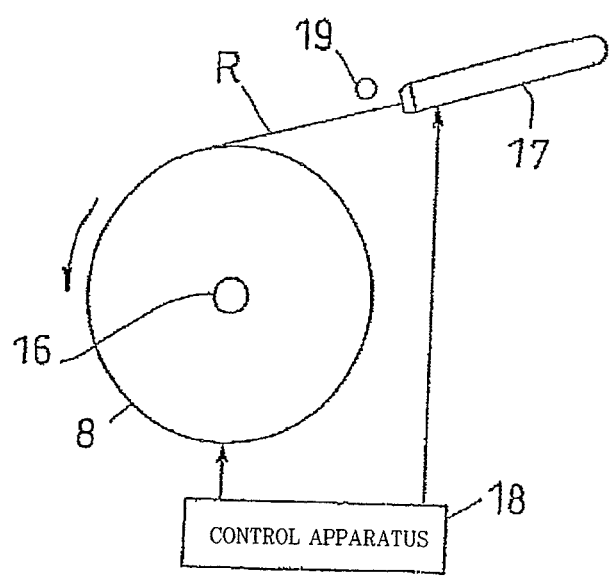
FIG. 2 is a side view showing a schematic structure of an apparatus winding a rubber ribbon.
Figure 3:
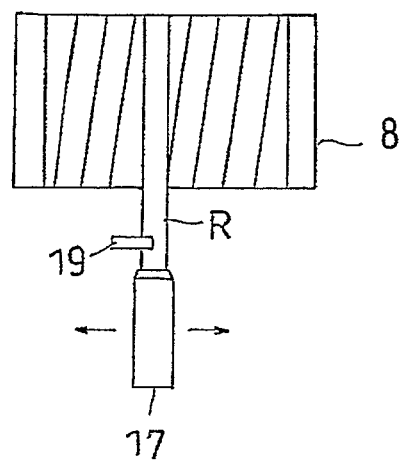
FIG. 3 is a plan view showing the schematic structure of the apparatus winding the rubber ribbon.
Figure 4:
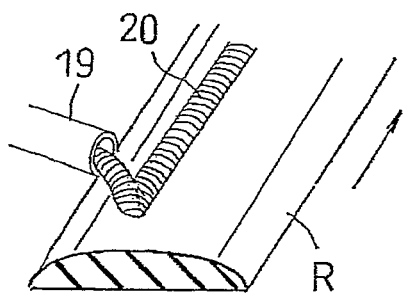
FIG. 4 is a cross sectional squint view showing a non-conductive rubber ribbon just after being extruded.

In the pneumatic tire mentioned above can be manufactured in the same manner as the conventional one, except a forming step of the tread rubber 10. Description will be given below of the forming step of the tread rubber 10. In the present embodiment, an apparatus shown in FIGS. 2 and 3 is used. A forming drum 8 is a cylindrical member structured such as to be rotatable around a shaft 16. A rubber ribbon feeding apparatus 17 has a function of extruding a non-conductive rubber ribbon R via a die having a predetermined shape so as to feed to the forming drum 8. The rubber ribbon feeding apparatus 17 is structured such as to be horizontally movable in a drum axial direction by a moving mechanism (not shown). In the present embodiment, there is shown an example using the non-conductive rubber ribbon R in which a cross section is formed in a flat semicircular shape as shown in FIG. 4.

A liquid material feeding apparatus 19 is provided near a discharge port of the rubber ribbon feeding apparatus 17, and has a function of throwing off a conductive liquid material 20 of fixed quantity so as to apply to an outer circumferential surface of the non-conductive rubber ribbon R. In this case, the conductive liquid material may be coated and expanded by using a brush, a roller or the like as occasion demands. The liquid material feeding apparatus 19 is structured such as to be mounted to the moving mechanism mentioned above so as to be horizontally movable with the rubber ribbon feeding apparatus 17, and a relative positional relation to the rubber ribbon feeding apparatus 17 is fixed. The control apparatus 18 controls an operation and a horizontal motion of the rubber ribbon feeding apparatus 17, a rotation of the forming drum 8, and an operation of the liquid material feeding apparatus 19.

The tread rubber 10 is formed as follows by using the apparatus mentioned above. First, two belt plies are laminated so as to be formed in a cylindrical shape on an outer circumferential surface of the forming drum 8, and the base rubber 11 is formed on the tire outer circumference. The base rubber 11 can be formed by winding a conductive rubber which is extrusion molded in a ribbon shape along the tire circumferential direction. In this case, the base rubber 11 may be formed by extruding the conductive rubber in a predetermined cross sectional shape and connecting the obtained extruded products annularly.

Subsequently, the cap rubber 12 is formed on the tire outer circumference of the base rubber 11. The cap rubber 12 is formed by winding and laminating the non-conductive rubber ribbon R along the tire circumferential direction. Specifically, it is possible to continuously and spirally wind the non-conductive rubber ribbon R along the tire circumferential direction by fixing a winding start end of the non-conductive rubber ribbon R to an outer circumferential surface of the base rubber 11, rotating the forming drum 8 from the state, and horizontally moving the rubber ribbon feeding apparatus 17 together therewith. It is possible to suitably regulate a rotating speed of the forming drum 8 and a horizontal moving speed of the rubber ribbon feeding apparatus 17 by the control apparatus 18, and the cap rubber 12 having a predetermined cross sectional shape is formed.

In the structure mentioned above, the conductive liquid material 20 is applied to the outer circumferential surface of the non-conductive rubber ribbon R wound around the forming drum 8 by the liquid material feeding apparatus 19, and the conductive layer 13 is provided. The conductive layer 13 continuously and spirally extends along the tire circumferential direction in correspondence to the winding of the non-conductive rubber ribbon R, and is embedded in the cap rubber 12 as shown in FIG. 1.

The non-conductive rubber ribbon R is wound such that the portion to which the conductive liquid material 20 is applied is connected to the outer surface of the base rubber 11, whereby it is possible to form the conductive layer 13 extending toward the tire outer circumferential side from the bottom surface 12a of the cap rubber 12. For example, it is possible to structure such that the conductive layer 13 is connected to the outer circumferential surface of the base rubber 11, by protruding the conductive liquid material 20 from an end surface of the winding start end of the non-conductive rubber ribbon R.

Figure 5:
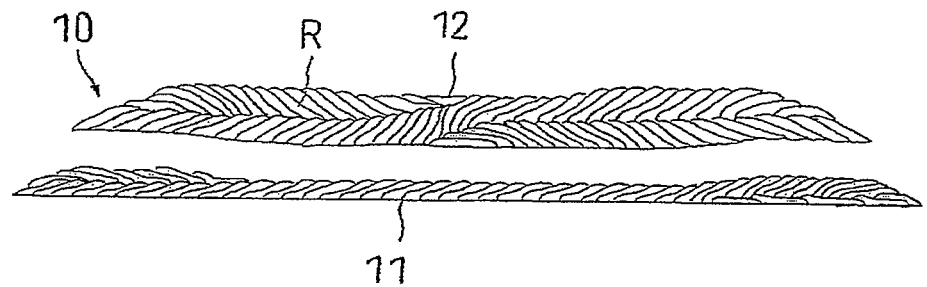
FIG. 5 is a cross sectional view of a formed tread rubber.

FIG. 5 is a tire meridian cross-sectional view of the formed base rubber 11 and cap rubber 12, and shows a state in which both the elements are away from each other. The non-conductive rubber ribbon R is wound to a right end in FIG. 5 from a start point in a center in the tire width direction, is turned back therefrom so as to be wound to a left end in FIG. 5, and is turned back one more time so as to be wound to the center and ended. A winding mode such as an overlapping width in the end portion of the non-conductive rubber ribbon R or the like is appropriately changed in process of winding, in such a manner that the cross sectional shape of the cap rubber 12 can be obtained, and the non-conductive rubber ribbon R is formed in various cross sectional shapes per the wound positions.

Further, since the formed tread rubber 10 is arranged in the tire outer circumferential side of the cylindrical carcass ply, the tire meridian cross section is deformed so as to be formed as an arch shape by gently curving from the state shown in FIG. 5, at a time of forming the tire.

Accordingly, the conductive layers 13 (not shown in FIG. 5) provided in a part of the non-conductive rubber ribbon R and interposed in the ribbon interface are scattered at various positions in the tire width direction and at various heights of the tire cross section in the inner portion of the cap rubber 12. As a result, even if the conductive layer 13 exposed on the tread surface is worn, the other portions tend to be newly exposed next to the worn layer, and it is possible to manufacture the pneumatic tire which can preferably secure the exposure of the conductive layer 13 on the tread surface even in the case where the irregular wear is generated, thereby achieving an excellent conductivity.

In the pneumatic tire, since the conductive layers 13 are scattered in the inner portion of the cap rubber 12, it is possible to achieve the excellent conductivity without being affected by a pattern design. Further, since it is easy to regulate the volume of the conductive layer 13, a rate of the conductive portion is not increased more than necessary, and it is possible to achieve an excellent mileage performance and wet performance without deteriorating an improving effect caused by the structure in which the cap rubber 12 is highly compounded with the silica. The volume of the conductive layer 13 and the width of the conductive layer 13 appearing on the tread surface may be set in any way as far as a desired conductivity can be suitably obtained.

Figure 6:
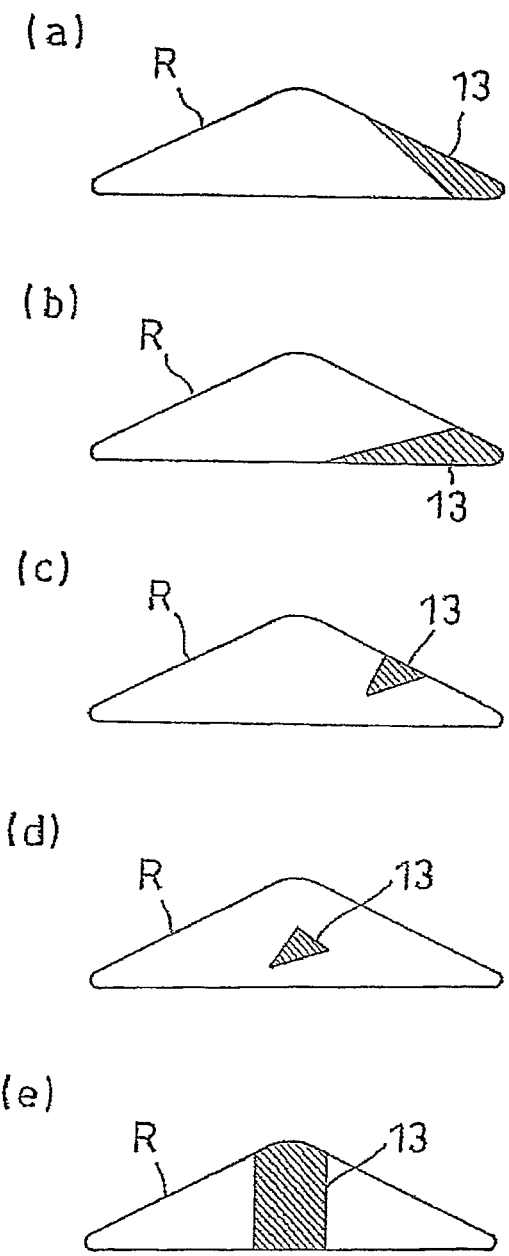
FIG. 6 is a cross sectional view of a non-conductive rubber ribbon exemplifying a position at which a conductive layer is provided.

In the embodiment mentioned above, there is shown an example in which the non-conductive rubber ribbon R is formed in the semicircular cross sectional shape, however, the present invention is not limited to this. In the present invention, it is possible to employ non-conductive rubber ribbons having various and preferable shapes such as a rectangular shape and a trapezoidal shape as shown by Second to Fourth embodiments mentioned below, a triangular shape as shown in FIG. 6, and the like. Further, it is possible to change the cross section of the non-conductive rubber ribbon R in the middle as far as being continuously wound.

The conductive layer 13 is not limited to the layer which is formed of the conductive liquid material 20 applied to the outer circumferential surface of the non-conductive rubber ribbon R, but may be formed, for example, by a conductive rubber arranged in a part of the non-conductive rubber ribbon R. In the case mentioned above, it is possible to employ a method of jointing a conductive rubber extrusion molded in a ribbon shape to the outer circumference of the non-conductive rubber ribbon R, and a method of co-extruding the non-conductive rubber ribbon and the conductive rubber by using a dual extruding machine.

The position at which the conductive layer 13 is provided is not particularly limited as far as the conductive layer 13 extends from the bottom surface of the non-conductive rubber layer so as to be exposed on the tread surface. For example, the conductive layer 13 can be provided in a part of the non-conductive rubber ribbon R as shown in FIGS. 6(a) to 6(c), and a part of the inner portion of the non-conductive rubber ribbon R as shown in FIGS. 6(d) and 6(e). Further, the cross sectional shape of the conductive layer 13 is not limited, but can employ various and preferable shapes such as a thin rectangular shape obtained by applying the conductive liquid material, a triangular shape and the like as shown in FIG. 6.

Figure 7:
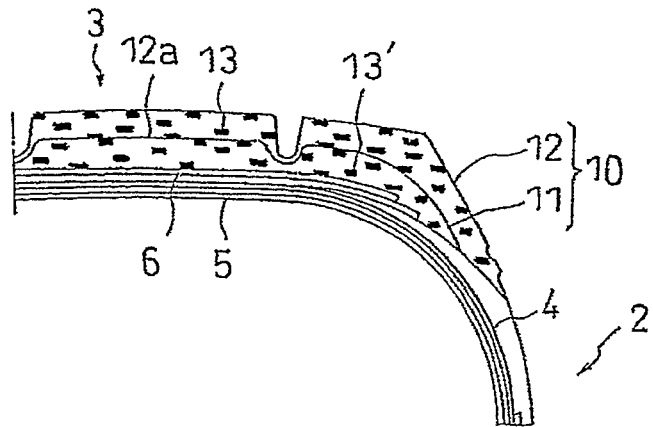
FIG. 7 is a partly cross sectional view of a tire meridian of a pneumatic tire in accordance with another embodiment of the present invention.

In the embodiment mentioned above, there is shown the example in which the tread rubber is formed as the cap and base structure, the cap rubber is structured by the non-conductive rubber layer embedding the conductive layer therein, and the base rubber is structured by the conductive rubber, however, the present invention is not limited to this. For example, the base rubber 11 can be constituted by a non-conductive rubber layer in which a conductive layer 13' is embedded, such as a tread rubber 10 shown in FIG. 7.

Further, the present invention is not limited to the structure in which the tread rubber is formed as the cap and base structure, but may be a structure in which the non-conductive rubber layer embedding the conductive layer therein singly constructs the tread rubber. In the case mentioned above, it is possible to form the non-conductive rubber layer by winding and laminating the non-conductive rubber ribbon on a green carcass in place of on the forming drum.

[Second Embodiment]

Since a second embodiment has the same structure and operation as those of the first embodiment except the following structures of the tread rubber, a description will be given mainly of different points by omitting the common points. In this case, the same reference numerals are attached to the same members and positions as the already described members and positions in the description of the first embodiment, and an overlapping description will be omitted.

Figure 8:
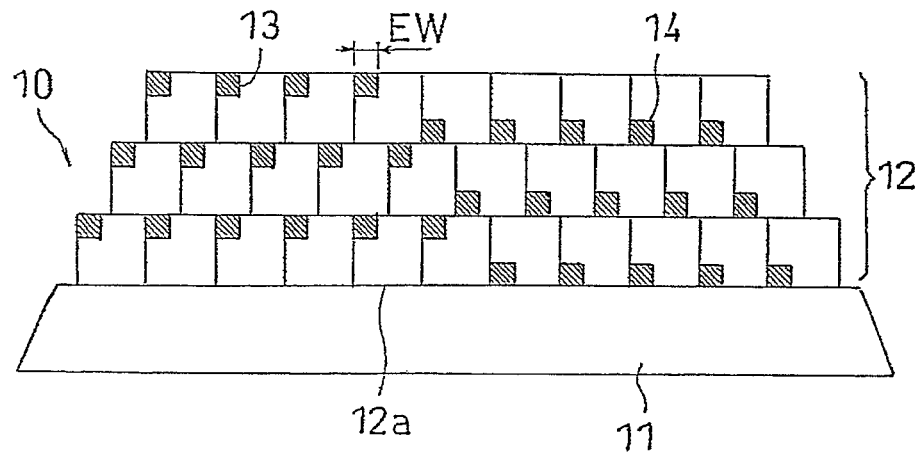
FIG. 8 is a cross sectional view of a tire meridian schematically showing a tread rubber of a pneumatic tire in accordance with a second embodiment of the present invention.

FIG. 8 is a cross sectional view of a tire meridian schematically showing a tread rubber of a pneumatic tire in accordance with a second embodiment of the present invention. The tread rubber 10 is formed as a cap and base structure provided with the base rubber 11 and the cap rubber 12 (corresponding to the non-conductive rubber layer). The base rubber 11 is formed of a conductive rubber in which a carbon black is compounded as a reinforcing agent at a high rate, and is formed by annularly connecting the conductive rubbers extruded in a predetermined cross sectional shape in the present embodiment.

The cap rubber 12 is formed of a non-conductive rubber in which a silica is compounded as the reinforcing agent at a high rate, and is formed by spirally winding and laminating the ribbon-shaped non-conductive rubber ribbon along the tire circumferential direction. FIG. 8 conceptually shows, a size of the rubber ribbon with respect to the cross section of the tread rubber 10 is actually finer, and a cross sectional shape becomes complicated.

Two conductive layers 13 and 14 formed in a ribbon shape are embedded in the cap rubber 12. Each of the conductive layers 13 and 14 continuously and spirally extends along the tire circumferential direction from the bottom surface 12a of the cap rubber 12 toward the tire outer circumferential side. In the present embodiment, the conductive layer 13 is provided in a left half region in FIG. 8 of the tread rubber 10, and the conductive layer 14 is provided in a right half region in the same manner. Further, the conductive layer 13 is exposed on the tread surface, and the conductive layer 14 is not exposed on the tread surface, and is arranged while being differentiated in the height of the tire cross section from the conductive layer 13.

In accordance with the structure mentioned above, it is possible to discharge the electricity to the road through the conductive layer 13 in the early stage of the wear, and it is possible to prevent various problems by suppressing an accumulation of the electricity in the vehicle body. Further, the conductive layers 13 and 14 are scattered to the inner portion of the cap rubber 12 as mentioned above, however, in the present embodiment, since a plurality of conductive layers 13 and 14 are formed while being differentiated the height of the tire cross section, it is possible to effectively increase the degree of the scattering, and it is possible to arrange the conductive layers 13 and 14 at various positions in the tire width direction and various heights of the tire cross section. As a result, if the conductive layer 13 exposed on the tread surface is worn, the other portion of the conductive layer 13 or the conductive layer 14 is exposed next to the worn layer. Since the other portion of the conductive layer is newly exposed even if the layer is worn, an exposure frequency of the conductive layer on the tread surface is secured, and it is possible to achieve an excellent conductivity.

Figure 9:
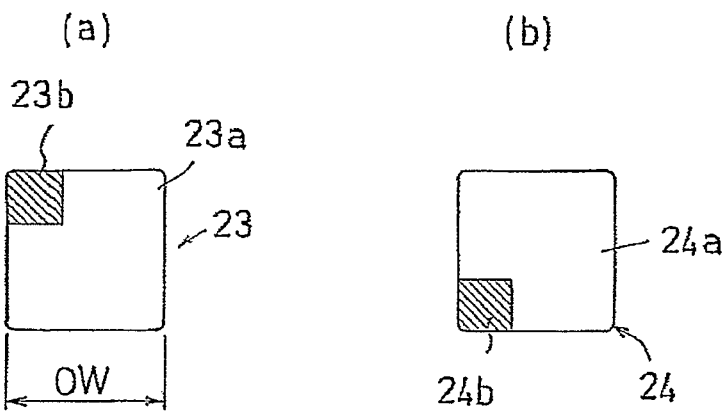
FIG. 9 is a cross sectional view of a rubber ribbon.

In the present embodiment, two rubber ribbons 23 and 24 shown in FIG. 9 are used as the non-conductive rubber ribbon. The rubber ribbon 23 (corresponding to the first rubber ribbon mentioned above) shown in FIG. 9(a) is formed by arranging a conductive rubber 23b in a part of a tire outer circumferential portion of a non-conductive rubber ribbon 23a, and the conductive rubber 23b forms to the conductive layer 13. Further, the rubber ribbon 24 (corresponding to the second rubber ribbon mentioned above) shown in FIG. 9(b) is formed by arranging a conductive rubber 24b in a part of a non-conductive rubber ribbon 24a, and the conductive rubber 24b forms to the conductive layer 14.

In the rubber ribbon 23, the conductive rubber 23b is provided in a part of the tire outer circumferential side portion of the non-conductive rubber ribbon 23a, however, in the rubber ribbon 24, the conductive rubber 24b is provided at a different position (a part of the tire inner circumferential side portion in the present embodiment) from the rubber ribbon 23 in a part of the non-conductive rubber ribbon 24a. The rubber ribbon having the structure mentioned above is formed by jointing the conductive rubber to an independently extruded non-conductive rubber, or co-extruding the non-conductive rubber and the conductive rubber.

It is preferable that a width EW of the conductive layers 13 and 14 satisfies a relation 0.1 mm<EW<5 mm. Accordingly, it is possible to inhibit the conductive layers 13 and 14 from being broken in the middle due to the irregular wear of the tread rubber 10 or the like so as to secure the conductivity, and it is possible to well secure a good mileage and a wet performance in the present embodiment in which the non-conductive rubber is compounded with the silica at a high rate, without deteriorating the improving effect obtained by constructing the cap rubber 12 by the non-conductive rubber.

It is preferable that a width (a maximum width) OW of the rubber ribbons 23 and 24 satisfies a relation 0.5 CW≥OW>EW in a relation between the width EW and a contact width CW. 0.5 to 5.0 mm is exemplified as a thickness (a maximum thickness) of the rubber ribbons 23 and 24, and a thickness of the conductive rubber forming a part of the rubber ribbon is exemplified by 0.1 to 5.0 mm.

Description will be given below of the forming step of the tread rubber 10. First, a winding start end of the rubber ribbon 23 is fixed to a left end in FIG. 8 in the tire outer circumferential side surface of the base rubber 11. Subsequently, it is continuously and spirally wound along the tire circumferential direction toward the right side, and is thereafter turned back near the center so as to be wound and laminated toward the left side. Further, it is again turned back at the left and so as to be wound and laminated toward the right side, and a winding terminal end is fixed to a portion near the center. Accordingly, a left half in FIG. 8 of the tread rubber 10 is formed.

The rubber ribbon 24 is wound symmetrically with the rubber ribbon 23 approximately in the same manner, and a right half in FIG. 8 of the tread rubber 10 is formed. The rubber ribbon 24 may be wound after finishing the winding of the rubber ribbon 23, however, it is preferable and efficient that both the ribbons are wound at the same timing.

Figure 10:
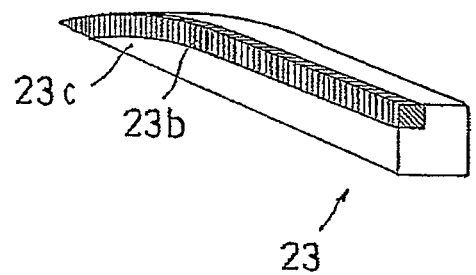
FIG. 10 is a squint view schematically showing an example of a winding mode of the rubber ribbon.

The respective rubber ribbons 23 and 24 are wound such that the conductive rubbers 23b and 24b are connected to the tire outer circumferential side surface of the base rubber 11, whereby it is possible to make the conductive layers 13 and 14 extend toward the tire outer circumferential side from the bottom surface 12a of the cap rubber 12. Specifically, an end surface 23c of the winding start end is attached to the tire outer circumferential side surface of the base rubber, such as the rubber ribbon 23 shown in FIG. 10. Alternatively, a conductive liquid material may be applied such as to connect the conductive rubber 23b in the end surface 23c to the tire outer circumferential side surface of the base rubber. In the case of forming a part of the tire inner circumferential side portion by the conductive rubber 24b such as the rubber ribbon 24, it is sufficient to simply wind.

The apparatus shown in FIGS. 2 and 3 can be used for winding each of the rubber ribbons 23 and 24, however, since the present embodiment is structured such that the conductive layers 13 and 14 are provided by arranging the conductive rubbers 23b and 24b on the outer circumference of the non-conductive rubber ribbons 23a and 24a, it is unnecessary to use the liquid material feeding apparatus 19.

The conductive layer 13 continuously and spirally extends along the tire circumferential direction in the state in which the rubber ribbon 23 is wound, and is exposed on the tread surface from the bottom surface 12a of the cap rubber 12 toward the tire outer circumferential side. On the other hand, the conductive layer 14 continuously and spirally extends along the tire circumferential direction in the state in which the rubber ribbon 24 is wound, and is not exposed on the tread surface while extending toward the tire outer circumferential side from the bottom surface 12a of the cap rubber 12.

In the present embodiment, there is formed at a position in which cross sectional areas and cross sectional shapes before being wound of the rubber ribbon 23 and the rubber ribbon 24 are the same, and the conductive rubber 24b is different in a tire cross sectional height from the conductive rubber 23b. Accordingly, it is possible to make the winding conditions of both the rubber ribbons 23 and 24 equal so as to precisely form the cap rubber 12, and it is possible to suitably differentiate the tire cross sectional height between the conductive layer 13 and the conductive layer 14. As a result, it is possible to manufacture the pneumatic tire which preferably secures the exposure frequency of the conductive layers 13 and 14 on the tread surface as mentioned above, thereby achieving the excellent conductivity.

In this case, the structure may be made such as to differentiate the cross sectional areas and the cross sectional shapes before being wound of both the rubber ribbons 23 and 24. Further, the conductive layers 13 and 14 can be formed of the conductive liquid material. For example, the cap rubber 12 as mentioned above can be formed by using two rubber ribbons including a non-conductive rubber ribbon in which the conductive liquid material is applied to the tire outer circumferential side portion, and a non-conductive rubber ribbon in which the conductive liquid material is applied to the tire inner circumferential side portion, and winding them.

EXAMPLES

An example tire which concretely shows the structure and effect of the present invention will be explained. In this case, each of performances of the tire is evaluated as follows.
(1) Conductivity An electric resistance is measured by applying a load of a maximum load×0.88×0.8 in accordance with the standard mentioned below to a tire prepared at a measuring rim width designated by ETRTO/JATMA/TRA while setting an internal pressure to 200 kPa, and applying an impressed voltage (100 V) to a metal plate with which the tire is grounded, from a shaft supporting the rim. The measurement mentioned above is executed in two stages including a new time having no wear and a 60% wear time when the tire is worn at 60% of a depth of a main groove formed in the tread rubber, it is evaluated that there is no problem in the case where the electric resistance is equal to or less than 1.00E+08Ω.
(2) Wet Performance The tire is installed to all the wheels of an actual car (2000 cc, 4-door sedan, two passenger ride), and a braking distance from a traveling speed 90 km/h to a vehicle stop is measured an the wet road surface. An index number evaluation is executed by setting the comparative example 1-1 to 100, the greater index number indicates a shorter braking distance and an excellent wet performance.
(3) Rolling Resistance A test is executed by using a tire prepared at a measuring rim width designated by ETRTO/JATMA/TRA while setting an internal pressure to 200 kPa, and a rolling resistance (RR: rolling resistance) at a traveling speed 80 km/h is measured. An index number evaluation is executed by setting the comparative example 1-1 to 100, the greater index number indicates a smaller rolling resistance and a better mileage.

Comparative Example 1-1

The comparative example 1-1 is set to a pneumatic tire (tire size: 205/65R15 94H, contact width CW: 170 mm) in which a tread rubber is constituted by a two-layer structure including a base rubber made of a conductive rubber and a cap rubber made of a non-conductive rubber, and a conductive layer is not provided in the cap rubber. The non-conductive rubber mentioned above uses a material in which a silica is included as a reinforcing agent at a weight ratio of 30%, and a carbon black is included at a weight ratio of 7% (the same matter is applied to other examples).

Comparative Example 2-2

The comparative example 1-2 is set to a pneumatic tire which is the same as the comparative example 1-1 except a structure in which a conductive liquid material (a rubber paste in which a conductive rubber is compounded) is applied to a region reaching a bottom surface from both sides in a width direction of a surface of the cap rubber via side surfaces. The conductive rubber uses a material in which the carbon black is included as the reinforcing agent at a weight ratio of 0% and the carbon black is included at a weight ratio of 31% (the same matter is applied to other examples).

Examples 1-1 to 1-4

Examples 1-1 to 1-4 are set to pneumatic tires in which a tread rubber is constituted by a two-layer structure including a base rubber made of a conductive rubber and a cap rubber made of a non-conductive rubber, and two conductive layers are embedded in the cap rubber as shown in the second embodiment. For forming the cap rubber, there is used a rubber ribbon having a thickness of 2 mm and a rectangular cross sectional shape and formed of a conductive rubber partly (a portion having a thickness of 0.5 mm), and wound in accordance with a procedure shown in the second embodiment. Results are shown in Table 1.

As shown in Table 1, a conductive effect is not achieved in the comparative example 1-1. In this case, there is a risk that the electricity is accumulated in the vehicle body and a problem such as an earth ground to the human body, a radio noise or the like is generated. In the comparative example 1-2, the conductive effect is achieved in the initial stage of the wear, however, the conductive effect is deteriorated at the 60% wear time. The deterioration of the conductive performance is steady regardless of the rotating direction of the tire.

On the contrary, in the example 1-1, it is possible to achieve the excellent conductive performance while securing the wet performance and the mileage performance well, by setting the conductive layer in the cap rubber. Further, in the example 1-2, since the width of the conductive layer is small and tends to be cut in the middle, there is a case where the conductive performance is lowered at the 60% wear time, however, it is possible to approximately secure the conductive performance. In the example 1-3, the wet performance and the mileage performance are somewhat lowered, however, the conductive performance is secured. In the example 1-4, since the winding number is small due to the great ribbon width and the number of the conductive layers exposed on the tread surface is small, there is a case where the conductive performance is lowered at the 60% wear time, however, it is possible to approximately secure the conductive performance.

[Third Embodiment]

Since a third embodiment has the same structure and operation as those of the second embodiment except the following structures of the tread rubber, a description will be given mainly of different points by omitting the common points. In this case, the same reference numerals are attached to the same members and positions as the already described members and positions in the description of the first embodiment and the second embodiment, and an overlapping description will be omitted.

Figure 11:
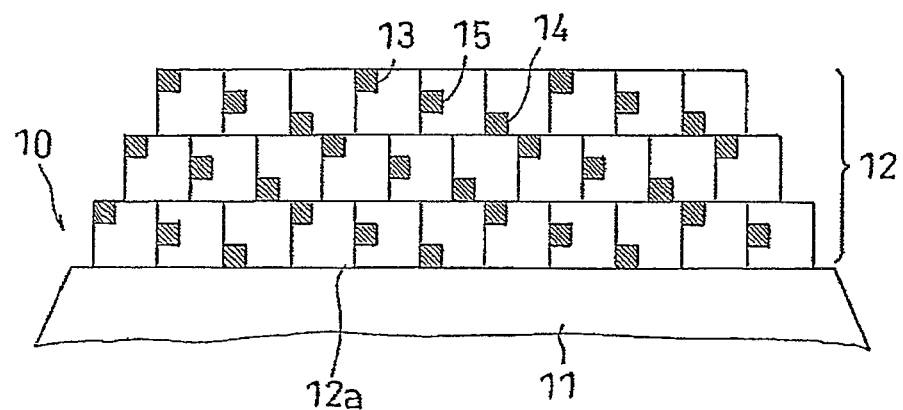
FIG. 11 is a cross sectional view of a tire meridian schematically showing a tread rubber of a pneumatic tire in accordance with a third embodiment of the present invention.

FIG. 11 is a cross sectional view of a tire meridian schematically showing a tread rubber of a pneumatic tire in accordance with a third embodiment of the present invention. In the tread rubber 10, three conductive layers 13, 14 and 15 are provided in the cap rubber 12 (corresponding to the non-conductive rubber layer) on the base rubber 11, and they are arranged so as to be differentiated in the tire cross-sectional height from each other. Each of the conductive layers 13, 14 and 15 continuously and spirally extends along the tire circumferential direction from the bottom surface 12a of the cap rubber 12 toward the tire outer circumferential side, and the conductive layer 13 in them is exposed on the tread surface.

In the present embodiment, since the tire cross sectional height of the conductive layer is different step by step than the

TABLE 1

|  | | | Electric resistance (Ω) | | | |
| --- | --- | --- | --- | --- | --- | --- |
|  | EW (mm) | OW (mm) | New tire | Tire of 60% wear | Wet performance | Rolling resistance |
| Comparative Example 1-1 | — | — | ∞ | ∞ | 100 | 100 |
| Comparative Example 1-2 | — | — | 1.00E+03 | 1.00E+10 (steady) | 100 | 100 |
| Example 1-1 | 1 | 10 | 1.00E+03 | 1.00E+03 | 100 | 100 |
| Example 1-2 | 0.05 | 10 | 1.00E+03 | 1.00E+10 (non-steady) | 100 | 100 |
| Example 1-3 | 7 | 10 | 1.00E+03 | 1.00E+03 | 95 | 95 |
| Example 1-4 | 0.1 | 100 | 1.00E+03 | 1.00E+10 (non-steady) | 100 | 100 | second embodiment, it is possible to more effectively increase the degree of the scattering of the conductive layer and it is possible to arrange the conductive layers 13, 14 and 15 at various positions in the tire width position and at various heights of the tire cross section. As a result, it is possible to increase the exposure frequency of the conductive layer on the tread surface and it is possible to achieve the more excellent conductivity.

Figure 12:
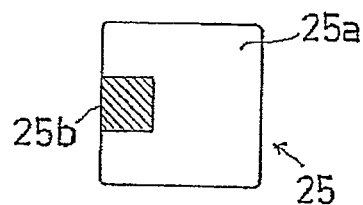
FIG. 12 is a cross sectional view of a rubber ribbon.

The tread rubber 10 is formed by using three rubber ribbons in which a rubber ribbon 25 shown in FIG. 12 is added to the rubber ribbons 23 and 24 mentioned above. The rubber ribbon 25 is formed by arranging a conductive rubber 25*b* in a part of a non-conductive rubber ribbon 25*a*, and the conductive rubber 25*b* forms the conductive layer 15. The conductive rubber 25*b* is provided at a different position (approximately at a center portion in a height direction of the non-conductive rubber ribbon 25*a* in the present embodiment) from the rubber ribbons 23 and 24 in a part of the non-conductive rubber ribbon 25*a*.

In the present embodiment, the winding of the rubber ribbon 23 is executed as follows. First, a winding start end of the rubber ribbon 23 is fixed to a left end in FIG. 11 in a tire outer circumferential side surface of the base rubber 11. Subsequently, the rubber ribbon is continuously and spirally wound along the tire circumferential direction toward the right side, and is turned back at the right end so as to be laminated toward the left side. Further, the rubber ribbon is turned back again at the left end so as to be wound and laminated toward the right end, and a winding terminal end is fixed to a right end.

The rubber ribbon 25 is wound in a state of being adjacent in the width direction of the rubber ribbon 23, and the rubber ribbon 24 is wound in a state of being adjacent in the width direction of the rubber ribbon 25, respectively at the same time and in the same manner as the rubber ribbon 23. The rubber ribbons 23, 24 and 25 wound as mentioned above are structured such that they are provided over a whole area in the width direction of the tread rubber 10, and even in the case where the irregular wear is generated in the tread rubber 10, anyone of the conductive layers 13, 14 and 15 is exposed on the tread surface and the conductivity is secured.

[Fourth Embodiment]

Since a fourth embodiment has the same structure and operation as those of the first embodiment except the following structures of the tread rubber, a description will be given mainly of different points by omitting the common points. In this case, the same reference numerals are attached to the same members and positions as the already described members and positions in the description of the first embodiment, and an overlapping description will be omitted.

In the present embodiment, in the same manner as the first embodiment, the tread rubber 10 is formed as the cap and base structure provided with the base rubber 11 and the cap rubber 12 (corresponding to the non-conductive rubber layer), and the tire meridian cross section becomes to the shape exemplified in FIG. 1. Further, the cap rubber 12 is formed by winding and laminating the non-conductive rubber ribbon along the tire circumferential direction by using the apparatus shown in FIGS. 2 and 3.

Figure 13:
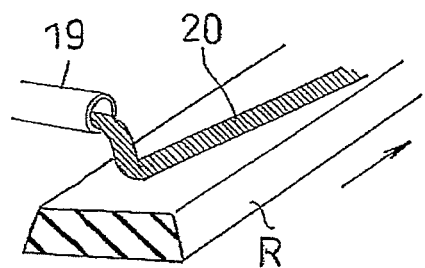
FIG. 13 is a cross sectional squint view showing a non-conductive rubber ribbon just after being extruded.
Figure 14:
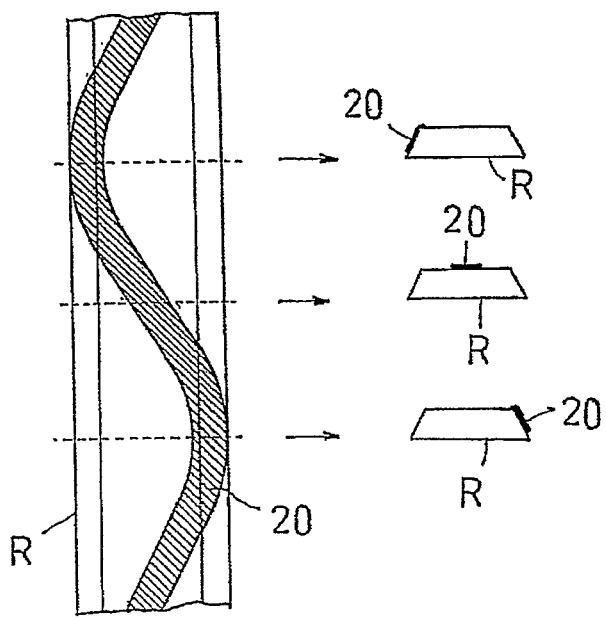
FIG. 14 is a plan view and a cross sectional view showing a non-conductive rubber ribbon to which a conductive liquid material is applied.

FIG. 13 is a cross sectional squint view showing a non-conductive rubber ribbon R just after being extruded. FIG. 14 is a view schematically showing a flat surface of the non-conductive rubber ribbon R to which the conductive liquid material is applied and cross sections in respective positions. The conductive liquid material 20 is continuously applied to a part of the outer peripheral surface of the non-conductive rubber ribbon R along the longitudinal direction while changing the position in the width direction with respect to the non-conductive rubber ribbon R, and extends in a waveform in a plan view.

Figure 15:
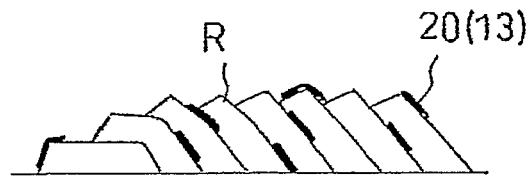
FIG. 15 is a cross sectional view showing a state of winding a non-conductive rubber ribbon.

Accordingly, since the non-conductive rubber ribbon R is wound, the conductive layer 13 continuously and spirally extends along the tire circumferential direction while changing the position in the width direction with respect to the non-conductive rubber ribbon R. Further, the applied position of the conductive liquid material 20 is not fixed as shown in FIG. 15, and the conductive layer 13 is arranged at various heights of the tire cross section. Accordingly, it is possible to effectively increase the degree at which the conductive layer 13 is scattered, it is possible to arrange the conductive layer 13 at various positions in the tire width direction and at various heights of the tire cross section, and it is possible to achieve an excellent conductivity while securing the exposure frequency of the conductive layer 13 on the tread surface.

In the present embodiment, as shown in FIG. 15, it is preferable to wind while overlapping the end portion of the non-conductive rubber ribbon R, whereby it is possible to incline the outer circumferential surface of the non-conductive rubber ribbon R so as to more securely differentiate the height of the tire cross section of the conductive layer 13.

Figure 16:
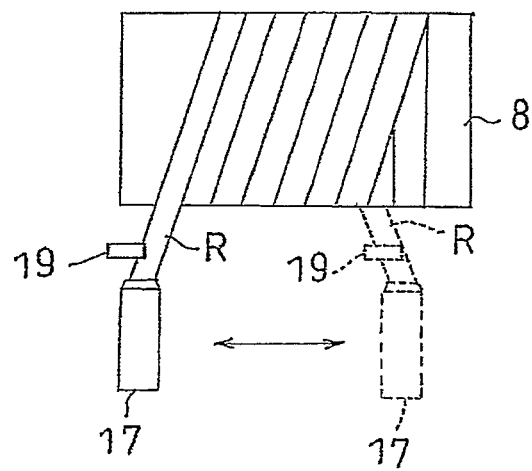
FIG. 16 is a plan view showing a state in which the non-conductive rubber ribbon is wound.

FIG. 16 is a plan view showing a state in which the non-conductive rubber ribbon R is wound. As mentioned above, although the relative positional relation between the rubber ribbon feeding apparatus 17 and the liquid material feeding apparatus 19 is fixed, it is possible to incline the non-conductive rubber ribbon R bridged over the forming drum 8 from the rubber ribbon feeding apparatus 17 so as to change the position for applying the conductive liquid material 20, by regulating the relative positional relation between the rubber ribbon feeding apparatus 17 and the forming drum 8, for example, by making the horizontal motion of the rubber ribbon feeding apparatus 17 greater than the first embodiment. In this case, the structure may be made such that an independent moving mechanism for individually moving the liquid material feeding apparatus 19 is provided.

Figure 17:
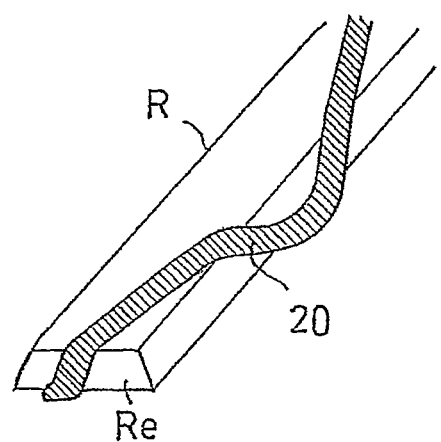
FIG. 17 is a squint view showing a portion near a winding start end of the non-conductive rubber ribbon.

The non-conductive rubber ribbon R is wound such that the portion to which the conductive liquid material 20 is applied is connected to the outer circumferential surface of the base rubber 11, whereby it is possible to form the conductive layer 13 extending from the bottom surface 12*a* of the cap rubber 12 toward the tire outer circumferential side. Specifically, as shown in FIG. 17, the structure may be made such as to connect to the outer circumferential surface of the base rubber 11, by applying the conductive liquid material 20 to an end surface Re of the winding start end of the non-conductive rubber ribbon R or protruding the conductive liquid material 20 from the side surface of the non-conductive rubber ribbon R.

The conductive liquid material 20 applied to the outer peripheral surface of the non-conductive rubber ribbon R in the tread surface side forms the conductive layer 13 exposing in the tread surface. Accordingly, it is possible to discharge the electricity generated in the vehicle body to the road through the conductive layer 13. In this case, there may be partly generated a portion where the positions to which the conductive liquid material 20 is applied come into contact with each other, between the non-conductive rubber ribbons R laminated in the inner and outer sides, however, since the conductive layer 13 shorts and the conductive path becomes short in the case mentioned above, a preferable structure for achieving the conductivity is achieved.

Example

Description will be given below of an example specifically showing the structure and the effect of the present invention.

In this case, since the respective performances of the tire are evaluated in accordance with the same method as the examples in the second embodiment mentioned above, description thereof will be omitted. In this case, in the evaluation of the wet performance and the mileage performance (the rolling resistance), an index number evaluation is executed by setting the Comparative example 2-1 to 100.

Comparative Example 2-1

The comparative example 1-1 is set to a pneumatic tire (tire size: 205/65R15 94H) in which a tread rubber is constituted by a two-layer structure including a base rubber made of a conductive rubber and a cap rubber made of a non-conductive rubber, and a conductive layer is not provided in the cap rubber. The non-conductive rubber mentioned above uses a material in which a silica is included as a reinforcing agent at a weight ratio of 30%, and a carbon black is included at a weight ratio of 7% (the same matter is applied to other examples).

Comparative Example 2-2

The comparative example 2-2 is set to a pneumatic tire which is the same as the comparative example 2-1 except a structure in which a rubber paste having a conductive rubber compounded therein is applied to a region reaching a bottom surface from both sides in a width direction of a surface of the cap rubber via side surfaces. The conductive rubber uses a material in which the silica is included as the reinforcing agent at a weight ratio of 0% and the carbon black is included at a weight ratio of 31% (the same matter is applied to other examples).

Examples 2-1

Examples 2-1 is set to pneumatic tires in which a tread rubber is constituted by a two-layer structure including a base rubber made of a conductive rubber and a cap rubber made of a non-conductive rubber, and conductive layer is embedded in the cap rubber as shown in the above mentioned embodiment. In this case, a rubber paste having the conductive rubber compounded therein is used as the conductive liquid material. Results are shown in Table 2.

TABLE 2

| | Electric resistance (Ω) | | Wet performance | Mileage performance |
|---|---|---|---|---|
| | New tire | Tire of 60% wear | | |
| Comparative Example 2-1 | ∞ | ∞ | 100 | 100 |
| Comparative Example 2-2 | 1.00E+03 | 1.00E+10 | 100 | 100 |
| Example 2-1 | 1.00E+03 | 1.00E+03 | 100 | 100 |

As shown in Table 2, a conductive effect is not achieved in the comparative example 2-1. In this case, there is a risk that the electricity is accumulated in the vehicle body and a problem such as an earth ground to the human body, a radio noise or the like is generated. In the comparative example 2-2, the conductive effect is achieved in the initial stage of the wear, however, the conductive effect is deteriorated at the 60% wear time. On the contrary, in the example 2-1, it is possible to achieve an excellent conductive performance while securing the wet performance and the mileage performance good even at the 60% wear time in addition to the new time, by setting the conductive layer in the cap rubber.

The invention claimed is:
1. A pneumatic tire comprising:
a non-conductive rubber layer constructing at least a tire outer circumferential side portion of a tread portion and formed by winding and laminating more than one non-conductive rubber ribbon along a tire circumferential direction; and
a conductive layer provided in a part of the non-conductive rubber ribbon and continuously and spirally extending along the tire circumferential direction and spirally extending around a rotation axis of the tire,
wherein the conductive layer is exposed on a tread surface and extends from a bottom surface of the non-conductive rubber layer, which is in contact with a base rubber layer, toward a tire outer circumferential side via a course extending continuously and spirally along the tire circumferential direction, and wherein a tire cross section comprises a plurality of pieces of the conductive layer scattered at various positions in the tire width direction and at various heights of the tire cross section and
wherein the non-conductive rubber layer comprises at least two non-conductive rubber ribbons and is formed by continuously and spirally winding and laminating respectively a first non-conductive rubber ribbon in which a first conductive layer is provided in a part of the tire outer circumferential side portion of the first non-conductive rubber ribbon and a second non-conductive rubber ribbon in which a second conductive layer is provided in a part of the second non-conductive rubber ribbon such that the second conductive layer is in a different position from the first conductive layer in a tire radial direction when disposed side by side in the tire width direction, along the tire circumferential direction and at least one of the conductive layers is exposed on the tread surface.
2. The pneumatic tire according to claim 1, wherein the conductive layer is formed of a conductive liquid material applied to an outer circumferential surface of the non-conductive rubber ribbon, or a conductive rubber arranged in a part of the non-conductive rubber ribbon.
3. The pneumatic tire according to claim 1, wherein the conductive layer continuously and spirally extends along the tire circumferential direction while changing a position in a width direction with respect to the non-conductive rubber ribbon.
4. A manufacturing method of a pneumatic tire comprising:
setting a first conductive layer in a part of a first non-conductive rubber ribbon such that the first conductive layer being on a tire outer circumferential side when a non-conductive rubber layer is formed,
setting a second conductive layer in a cart of a second non-conductive rubber ribbon such that the second conductive layer being in a different position from the first conductive layer in a tire radial direction when disposed side by side in the tire width direction,
forming the non-conductive rubber layer constructing at least the tire outer circumferential side portion of a tread portion by
continuously and spirally winding and laminating along the tire circumferential direction the first non-conductive rubber ribbon provided with the first conductive layer, and extending the first conductive layer from the bottom surface of the non-conductive rubber layer, which is in contact with a base rubber layer, to the tire outer circumferential side so as to be exposed on the tread surface; and continuously and spirally winding and laminating along the tire circumferential direction second non-conductive rubber ribbon provided with the second conductive layer and extending the second conductive layer from the bottom surface of the non-conductive rubber layer, which is in contact with the base rubber layer, to the tire outer circumferential side, whereby a tire cross section comprises pieces of the conductive layer scattered at various positions and at various heights of the tire cross section.

5. The manufacturing method of the pneumatic tire according to claim 4, wherein the step of setting each conductive layer in the part of respective non-conductive rubber ribbons is executed by applying a conductive liquid material to an outer circumferential surface of respective non-conductive rubber ribbons.

6. The manufacturing method of the pneumatic tire according to claim 4, wherein the step of setting each conductive layer in the part of respective non-conductive rubber ribbons is executed by continuously setting each conductive layer on an outer circumference of the non-conductive rubber ribbon along a longitudinal direction while changing a position in a width direction with respect to respective non-conductive rubber ribbons.

7. The manufacturing method of the pneumatic tire according to claim 6, wherein each conductive layer is formed of a conductive liquid material applied to an outer circumferential surface of respective non-conductive rubber ribbon.

\* \* \* \* \*